Figure 1:
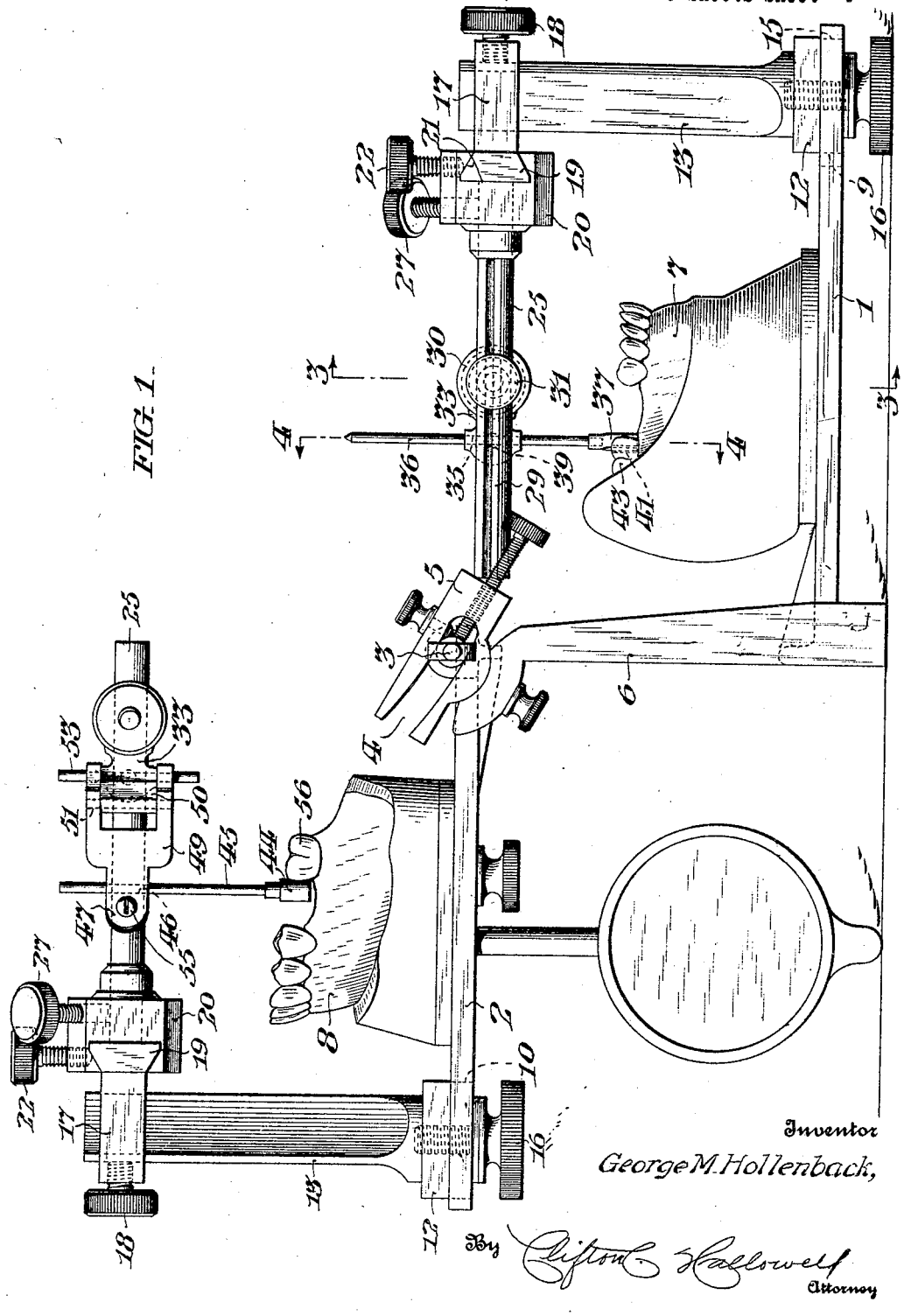

Sept. 4, 1928. 1,683,353
G. M. HOLLENBACK
PARALLELING MECHANISM
Filed Oct. 7, 1924 3 Sheets-Sheet 1

Inventor
George M. Hollenback,
By *Clifton C. Hallowell*
Attorney

Sept. 4, 1928.

G. M. HOLLENBACK

PARALLELING MECHANISM

Filed Oct. 7, 1924

Inventor
George M. Hollenback,
By *Clifton C. Hallowell*
Attorney

Sept. 4, 1928.    G. M. HOLLENBACK    1,683,353
PARALLELING MECHANISM
Filed Oct. 7, 1924    3 Sheets-Sheet 3
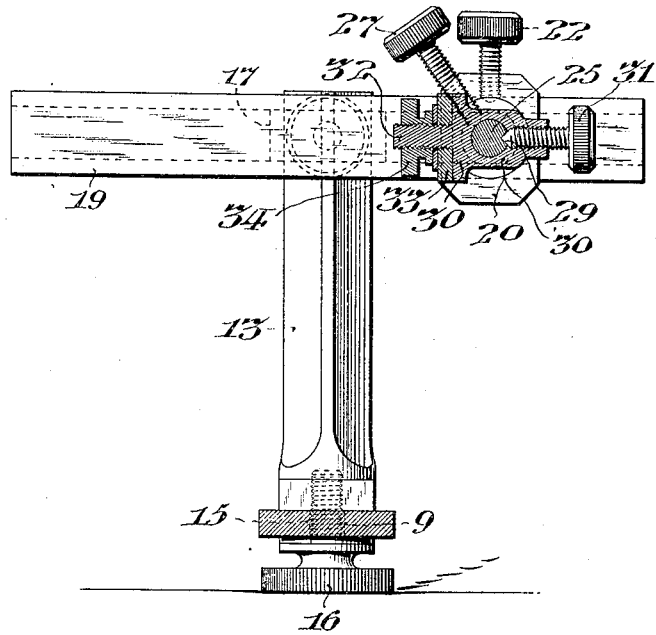
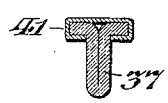
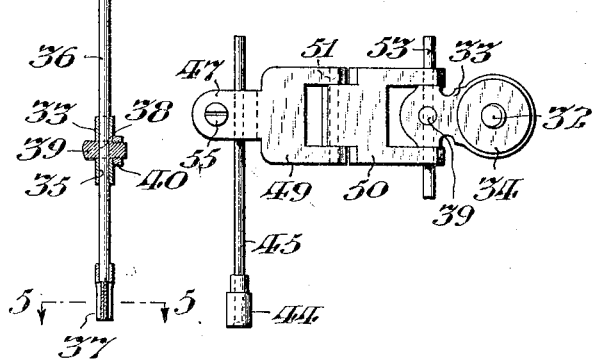
Inventor
George M. Hollenback,
By Clifton C. Hallowell
Attorney Patented Sept. 4, 1928.

1,683,353

UNITED STATES PATENT OFFICE.

GEORGE M. HOLLENBACK, OF LOS ANGELES, CALIFORNIA.

PARALLELING MECHANISM.

Application filed October 7, 1924. Serial No. 742,160.

My invention relates particularly to a device pertaining to that class of mechanism variously known as parallelers, parallelometers, or parallelogages, but which may be more specifically termed a parallelopositioner, being especially directed to mechanism having means adapted to position the supporting attachments of dental bridges or restorations in such parallel relation as to insure the free removal and replacement of said dental bridges or restorations, without producing a binding action or distortion of the relatively movable and fixed associated elements of the dental bridge or restoration attachments and their supporting abutments.

In some instances, where an artificial denture is required to replace teeth that have been missing for a considerable period of time, the teeth adjacent to the edentulous gap or open space in the dental arch, which form a natural abutment for the restoration, may have tilted from the conventional lines of said dental arch, so that the axis of such abutment may be considerably deflected from the normal axis of such teeth. Therefore, in fitting denture attachments to such displaced natural teeth of the dental arch, it is essential that said abutments be so formed and directed as to compensate for such distortion of the abutment teeth.

The principal objects of my invention are to provide paralleling mechanism, that may be readily attached to a dental articulator, with means so universally adjustable thereon as to correctly position the attachments of a dental bridge or restoration, not only in parallel relation, but in directions most suitable to the inclinations of the axes of the teeth which may be selected as abutments for said dental bridge or restoration.

Other objects of my invention are to provide paralleling mechanism with means whereby the abutment teeth may be surveyed and charted to determine the line of extreme convexity and the consequent maximum diameters to which a bridge or restoration, having its terminal attachments in the form of tooth embracing clasps, must conform.

My invention comprehends paralleling mechanism having attachment positioning means which may be adjusted vertically and horizontally either forward and back, or laterally, and may be rotated upon three relatively normal or adjustable axes, whereby an absolutely universal movement of said positioning means may be attained.

The form of my invention as hereinafter described comprises a standard which may be removably attached to either the lower denture model holder of an articulator or to the upper denture model holder of said articulator. Said standard is preferably polygonal in form and arranged to carry a cross-head slidable thereon for vertical adjustment, and provided with a cross-bar carrying a laterally adjustable block slidable thereon, and upon which is mounted for rotation a forwardly extending cylindrical spindle provided with a longitudinal slot. Mounted upon said spindle, to be slidably adjusted forward and back, is a tool carrier having a pintal or threaded stud upon which is mounted, for rotatable adjustment thereon, a chuck comprising a perforated projection through which the shank of a tool, such as a positioner device, may adjustably extend, or the shank of such tool or device may be connected with the tool carrier by a linked connection or extender, and may carry a marking device capable of traversing an irregular path.

My invention also includes all of the various novel features of construction and arrangement as hereinafter more definitely specified.

In the accompanying drawings, Figure 1 is a side elevational view of a dental articulator having the lower and upper denture models mounted thereon and showing the upper denture model holder thrown back in open or separated position, and a parallelopositioner conveniently embodying my invention attached to each of said denture model holders, in operative relation to said denture models; Fig. 2 is a plan view of the structure shown in Fig. 1; Fig. 3 is a transverse vertical sectional view of said structure, taken axially through the tool holder on the line 3—3 in Figs. 1 and 2, the denture model being omitted for convenience of illustration; Fig. 4 is a transverse vertical sectional view, taken through the chuck on the line 4—4 in Fig. 1; Fig. 5 is a horizontal transverse sectional view of the tool shown in Figs. 1 and 4, taken on the line 5—5 in Fig. 4, and showing the boxing thereon in section; Fig. 6 is a perspective view of the boxing or lining to be placed in the tooth by the tool; and Fig.

7 is a side elevational view of the tool carrier including the linked connection attached thereto, extended in a plane, and carrying a tool comprising a marking roller.

In said figures, the articulator comprises the lower denture model holder 1, to which the upper denture model holder 2 may be conveniently connected for relative oscillation upon the trunnions 3, which may be removably supported in the bearing slots 4, formed in the bearing frames 5 at the top of the columns 6. Said denture model holders 1 and 2 respectively carry the denture models 7 and 8 removably connected therewith. The free extremities of the denture model holders are respectively provided with the slots 9 and 10, forming the bifurcated terminals thereof, which afford suitable guides for the base 12 of the standard 13, said base being provided with the rectangular boss 15 extended into said slots 9 or 10 in slidable relation with the walls thereof, said base being slidably connected for longitudinal adjustment on the denture model holders and secured in adjusted position thereon by the set screw 16, which is extended through said rectangular boss 15, and which also serves as a foot for the forward end of the lower denture model holder.

As shown in the drawings, the standard 13 may preferably be of triangular configuration, and is arranged to support the cross-head 17, which is provided with a triangular aperture conforming to the shape of said standard, extended therethrough and which is arranged to be adjusted vertically, and to be engaged in any adjusted position thereon by means of the set screw 18. Said crosshead 17 comprises the beveled cross-bar 19 extended transversely thereof upon opposite sides of the articulator, and serves to slidably support thereon the slide-block 20, which has a slot 21 whose opposed walls are beveled to conform to the beveled cross-bar 19, and said slide-block is arranged to slide laterally upon said cross-bar, to be adjusted upon opposite sides of the medial plane of the articulator and be secured thereto in any such adjusted position by the set screw 22.

The slide-block 20 carries the spindle 25, which is extended therefrom horizontally in the direction of the medial vertical plane of the articulator, and which is mounted for rotation upon its axis in the socket 26 in said slide-block, and said spindle may be rotated into any adjusted position and secured by the set screw 27, which is in threaded engagement with said slide-block and which is arranged to frictionally bear against said spindle.

The spindle 25, which is provided on one side with a longitudinally extended slot 29, has the tool carrier 30 slidably mounted thereon for longitudinal adjustment, and comprising the set screw 31, which cooperates with the walls of said slot to prevent its relative rotation on the spindle, and to secure said tool holder in any desired adjusted position with respect to the length of said spindle. Said tool carrier 30 is provided with the threaded stud 32, upon which the tool-engaging chuck 33 is mounted for rotatable adjustment, and said chuck is arranged to be secured in adjusted position on said tool carrier by the thumb-nut 34 on said stud. The chuck 33 is provided with an aperture 35, through which the shank 36 of a tool 37 may extend, and in which it may be secured in rigid relation to said chuck by extending transversely through an aperture 38 in the bolt 39, which intersects said aperture 35, and is longitudinally adjusted in said chuck by the nut 40 to lock and rigidly hold the shank 36 of the tool 37 therein in any desired adjusted position, it being obvious that the adjustment of said tool may be rotatable or longitudinal with respect to its own axis.

The tool shown in the chuck 33 of the parallelopositioner carried by the lower denture model holder, comprises a T-shaped head upon which the boxing 41, forming the lining of the socket of a tooth to be employed as a terminal anchor for a bridge or restoration, may be carried into position and inserted into the cavity 42, in said tooth 43, on the denture model 7, in a predetermined position by proper adjustment of the relatively movable parts of the parallelopositioner and by thrusting the tool axially into said cavity.

The tool shown in connection with the parallelopositioner carried by the upper denture model holder, comprises a roller 44, whose shank 45 is engaged in the opposed grooves 46 in the split tongue 47 of the link 49, forming a unit of the linked connection comprising the links 49 and 50, which are pivotally connected by the pintal 51, and hingedly connected with the chuck 33 by the pintal 53, said shank being rigidly engaged in the split tongue 47 of the link 49 by the set screw 55, tending to draw the split members of said tongue together and thereby clamp said shank 45 therebetween. The linked connection thus formed permits freedom of movement of the tool comprising the roller 44, with its axes posed in a predetermined direction, so as to permit said roller to traverse the irregular surface of a tooth 56, and, when provided with a coating of ink or other marking material, may produce upon the surface of said tooth a line indicating the line of extreme convexity and consequent maximum diameters of such tooth, and thereby indicate the size and form of tooth embracing clasps which will snugly fit said tooth, and which may be engaged therewith and withdrawn therefrom without wedging or being otherwise distorted.

It may be assumed that the models mounted upon the model holders of the articulator correctly represent the lower and upper denture arches of the patient requiring restoration of a lower right molar and an upper right molar, and that the former may be engaged with the adjoining teeth by means of anchor terminal heads fitted in suitably provided complementary sockets in inlays of the anchor abutment teeth adjoining the edentulous space, and that the latter may preferably be engaged with the adjoining teeth by means of clasps fitted to embrace the adjoining teeth of the dental arch.

Having ascertained from a survey of the position of the teeth of the dental arch the desired direction of engagement and removal of the replacement, which obviously may be a single tooth, or a bridge comprising a plurality of teeth, the tool 37, carrying the boxing 41, may be posed to conform to the required inclination by rotating the chuck 33 about the axis of its threaded stud 32, and by rotating the spindle 25 about its axis, then the chuck, carrying the tool 37 properly posed, may be shifted forward or back along the spindle 25 to position the tool longitudinally with respect to the medial plane of the denture, and the slide-block 20 may be shifted laterally on the cross-bar 19 to position said tool laterally with respect to said medial plane over the tooth serving as an anchor, and the cross-head may be adjusted vertically upon the standard 13 to bring said tool into close proximity to said anchor or abutment tooth. When the tool is thus located, it may be thrust axially through the chuck 33 into the cavity 42 in said tooth and hold the boxing 41 in proper pose while said cavity is packed with wax or other suitable material, after which the tool may be withdrawn and the inlay made in any well known manner.

If the case be one in which the restoration may better be attached to the anchor tooth abutments by clasps which embrace the anchor teeth, the contour or maximum convexity of said teeth in a plane normal to the direction of the movement of the replacement in engaging and disengaging it from its abutments, may be determined by the structure shown mounted on the upper denture model holder, which may be posed as above described, except that instead of positioning the tool for axial insertion into the cavity in the tooth, the tool comprising the roller 44, disposed in proper position, is so positioned as to be capable, by reason of its flexible linked support, of movement to traverse the side walls of the abutment teeth, and said roller 44 may have its surface inked or otherwise treated, so as to inscribe a line upon said abutment teeth, indicating their maximum convexity to which the clasps are to be fitted, and to best withdraw therefrom without friction or distortion of the replacement.

It will be obvious that after having determined the proper pose of the tool and having set the parallelopositioner in accordance therewith, said parallelopositioner may be bodily removed from the articulator and replaced thereon without disturbing the pose or relation of the tool with respect to the teeth.

My invention is advantageous in that the tool may be set in the required position of direction and maintained so posed while being shifted to engage it with different teeth on the dental arch, or as many teeth as may be required for anchor abutments of the bridge or replacement.

I do not desire to limit my invention to the precise details of construction and arrangement as herein set forth, as it is obvious that various modifications may be made therein without departing from the essential features of my invention as defined in the appended claims.

Having thus described my invention, I claim:

1. A device of the class described, comprising a support, a forwardly directed spindle adjustable bodily in a lateral direction on said support, in a lineal path, and a tool carried thereby and mounted to rotate about three relatively normal axes, and arranged to move in three relatively angular planes.

2. A device of the class described, comprising a support, a forwardly directed spindle adjusted bodily in a vertical direction on said support, in a lineal path, and a tool carried thereby and mounted for adjustment about three relatively angular axes, and arranged to move vertically and in relatively transverse planes.

3. A device of the class described, comprising a support, a forwardly directed spindle adjusted bodily either in a lateral or vertical direction on said support, in a lineal path, and a tool carried thereby and mounted for adjustment about three relatively adjustable axes, and arranged to move forward and back, up and down, and laterally in relatively normal planes.

4. A device of the class described, comprising a support, a forwardly directed spindle adjustable laterally and vertically on said support, in a lineal path, and a tool carried thereby and arranged to be lineally adjustable vertically, laterally, and longitudinally, and mounted to rotate about three relatively normal axes.

5. A device of the class described, comprising a support, means carried by said support adjustable laterally on said support, in a lineal path, and a tool carried thereby arranged for rotary movement about a plurality of adjustable axes capable of vertical, lateral, and forward and back lineal, adjustments, whereby the movement of said tool is universal.

6. A device of the class described, comprising a support, means directed forwardly adjustable laterally and vertically on said support, in a lineal path, and a tool carried thereby movable into any desired position or inclination, and arranged to be thrust axially forward in different regions while maintaining a predetermined pose or inclination, and without rotation about its axes.

7. A device of the class described, comprising a support, a cross-head slidable thereon, a slide-block movable laterally on said cross-head, and a tool carried thereby arranged for rotary movement about a plurality of relatively adjustable axes capable of vertical, lateral, and forward and back adjustments while being maintained in a predetermined direction and capable of movement into different positions while maintaining its pose of direction.

8. A device of the class described, comprising a support, a cross-head movable vertically thereon, means to secure said cross-head in any adjusted position, a slide-block mounted for lateral movement on said crosshead, means arranged to secure said slide-block in adjusted position thereon, a rotatable spindle carried by said slide-block, means arranged to arrest the rotation of said spindle in different positions of rotation, a tool carrier slidable forward and backward on said spindle, means arranged to secure said tool carrier on said spindle, a chuck rotatably mounted on said tool carrier, means arranged to secure said chuck in any adjusted position thereon, a tool arranged to be engaged with said chuck, being capable of axial and rotatable adjustment therein, and means cooperative with said chuck arranged to secure said tool thus adjusted.

9. In a device of the class described, the combination with a support, of a cross-head movable vertically thereon, a slide-block movable laterally on said cross-head, a rotatable spindle carried by said slide-block and extended therefrom, a tool carrier mounted for axial adjustment on said spindle, and having a tool-holding chuck arranged to rotate thereon about an axis normal to the axis of said spindle, and a tool mounted for rotatable adjustment in said chuck about an axis normal to the axis of rotation of said chuck.

10. In a device of the class described, the combination with an articulator having a lower denture model holder and an upper denture model holder movably connected therewith, of a support adjustably connected with either of said denture model holders, a cross-head carried by said support and adjustable vertically thereon, a slide-block carried by said cross-head and arranged for lateral adjustment, a rotatable spindle having a slot, carried by said slide-block, a tool carrier mounted for axial adjustment on said spindle, means on said tool carrier cooperative with said slot to prevent rotation of said tool carrier with respect to said spindle, a tool-holding chuck carried by said tool carrier and arranged for rotatable adjustment thereon about an axis normal to the axis of said spindle, and a tool mounted in said chuck arranged to be rotatably adjusted therein about the axis of said tool, and to be axially adjusted in and out of said chuck.

11. In a device of the class described, the combination with an articulator having a lower denture model holder and an upper denture model holder movably connected therewith, of a support adjustably connected with either of said denture model holders, a cross-head carried by said support and adjustable vertically thereon, a slide-block carried by said cross-head and arranged for lateral adjustment, a rotatable spindle having a slot carried by said slide-block, and a tool carrier adjustable on said spindle, and comprising a jointed connection whereby a tool carried thereby may be caused to traverse an irregular path while maintaining a predetermined pose.

12. In a device of the class described, the combination with an articulator having a lower denture model holder and an upper denture model holder movably connected therewith, of a support adjustably connected with either of said denture model holders, a cross-head carried by said support and adjustable vertically thereon, a slide-block carried by said cross-head and arranged for lateral adjustment, a rotatable spindle having a slot carried by said slide-block, and a tool carrier adjustable on said spindle, and comprising a linked connection whereby a tool carried thereby may be caused to traverse an irregular path while maintaining a predetermined pose.

13. In a device of the class described, the combination with an articulator having a lower denture model holder and an upper denture model holder movably connected therewith, of a support adjustably connected with either of said denture model holders, a cross-head carried by said support and adjustable vertically thereon, a slide-block carried by said cross-head and arranged for lateral adjustment, a rotatable spindle having a slot carried by said slide-block, and a tool carrier comprising a linked extension forming a flexible connection, and having means cooperative with said slot to prevent its rotation on said spindle, and a tool carried by said flexible connection and having a marking device arranged to traverse an irregular path while being maintained posed in a predetermined direction.

14. In a device of the class described, the combination with an articulator having a lower denture model holder and an upper denture model holder movably connected therewith, of a support adjustably connected with either of said denture model holders, a cross-head carried by said support and adjustable vertically thereon, a slide-block carried by said cross-head and arranged for lateral adjustment, a spindle carried by said slide-block, a tool carrier comprising a linked extension forming a flexible connection and arranged for lineal and rotary adjustment on said spindle, and a tool carried by said flexible connection and having a marking device arranged to traverse an irregular surface while being maintained posed in a predetermined direction.

15. A device of the class described, comprising a support, means on said support arranged to move laterally with respect thereto in a lineal path, and a tool carried thereby arranged for rotary movement about a plurality of relatively adjustable axes capable of vertical, lateral, and forward and back movements while being maintained in a predetermined direction and capable of movement into different positions while maintaining its pose of direction.

16. A device of the class described, comprising a support, a carrier mounted on said support to move laterally with respect thereto in a lineal path, and a tool carried thereby arranged for rotary movement about a plurality of relatively adjustable axes while being maintained in a predetermined direction and while maintaining its pose of direction.

In witness whereof, I have hereunto set my hand this 21st day of September, A. D., 1924.

GEORGE M. HOLLENBACK.